(12) United States Patent
Tidwell et al.

(10) Patent No.: US 10,514,748 B2
(45) Date of Patent: Dec. 24, 2019

(54) REACTIVE POWER MANAGEMENT FOR NON-VOLATILE MEMORY CONTROLLERS

(71) Applicant: Western Digital Technologies, Inc., San Jose, CA (US)

(72) Inventors: Reed P. Tidwell, Salt Lake City, UT (US); Yoav Weinberg, Thornhill (CA); Daniel Tuers, Kapaa, HI (US); Matthew Davidson, Los Altos, CA (US); Eran Erez, Bothell, WA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 162 days.

(21) Appl. No.: 15/716,961

(22) Filed: Sep. 27, 2017

(65) Prior Publication Data
US 2019/0094938 A1 Mar. 28, 2019

(51) Int. Cl.
*G06F 1/32* (2019.01)
*G06F 1/324* (2019.01)
*G06F 1/329* (2019.01)
*G06F 3/06* (2006.01)
*G06F 9/50* (2006.01)

(52) U.S. Cl.
CPC .............. *G06F 1/324* (2013.01); *G06F 1/329* (2013.01); *G06F 3/0625* (2013.01); *G06F 3/0659* (2013.01); *G06F 9/5094* (2013.01)

(58) Field of Classification Search
CPC .................................. G06F 1/324; G06F 1/329
See application file for complete search history.

(56) References Cited

U.S. PATENT DOCUMENTS

| | | | |
|---|---|---|---|
| 7,805,558 B2* | 9/2010 | Atkinson | G06F 13/4054 710/306 |
| 8,478,928 B2* | 7/2013 | Lee | G06F 1/266 711/103 |
| 2013/0097433 A1* | 4/2013 | Boorman | G06F 1/3225 713/300 |
| 2018/0004688 A1* | 1/2018 | Chung | G06F 13/1673 |

* cited by examiner

*Primary Examiner* — Stefan Stoynov
(74) *Attorney, Agent, or Firm* — Loza & Loza, LLP; Gabriel Fitch (57) ABSTRACT

Systems, methods, and apparatus are provided that can reduce power consumption of memory controllers in response to memory command backlog in various situations. A data storage device includes a plurality of sets of non-volatile memory (NVM) devices, a central controller, and a plurality of channel controllers. Each channel controller is coupled to a distinct set of the plurality of sets of NVM devices. Each channel controller includes a command queue configured to store pending memory commands and provide backlog information. The central controller is configured to receive the backlog information of the command queues of the plurality of channel controllers, and adjust a clock frequency of the central controller and one or more clock frequencies of the plurality of channel controllers based on the backlog information such that the pending memory commands in each of the command queues are below a predetermined threshold level.

15 Claims, 6 Drawing Sheets

FIG. 6

REACTIVE POWER MANAGEMENT FOR NON-VOLATILE MEMORY CONTROLLERS

BACKGROUND

Solid state data storage systems are increasingly used for storing and managing data for electronic devices. A solid state data storage uses non-volatile memory for storing data. A typical non-volatile data storage device stores data as an electrical value (e.g., voltage) in non-volatile memory cells, and utilizes one or more memory controllers to manage data transactions across multiple non-volatile memory devices of the storage system.

Data transactions in a solid state data storage system are generally carried out by executions of memory commands. Some exemplary memory commands are reading, writing, and erasing non-volatile memory chips, for example, NAND flash memory chips. To facilitate this process, memory controllers are often constructed with command queues that facilitates command executions across multiple memory cells. In some data storage systems, multiple commands may be executed in parallel across multiple channels of the data storage system. However, the memory controllers may not be able to operate at full speed in some scenarios due to power limitation and/or processing delay in executing the memory commands.

SUMMARY

Various embodiments of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to manage power consumption in storage devices (e.g., solid-state drives, sometimes called SSDs).

Aspects of the present disclosure provides systems, methods, and/or apparatus to reduce power consumption of memory controllers in response to memory command backlog in various situations.

One embodiment of the present disclosure provides a data storage device. The data storage device includes a plurality of sets of non-volatile memory (NVM) devices, a central controller, and a plurality of channel controllers. Each channel controller is coupled to a distinct set of the plurality of sets of NVM devices. Each channel controller includes a command queue configured to store pending memory commands and provide backlog information. The central controller is configured to receive the backlog information of the command queues of the plurality of channel controllers, and adjust a clock frequency of the central controller and one or more clock frequencies of the plurality of channel controllers based on the backlog information such that the pending memory commands in each of the command queues are below a predetermined threshold level.

Another embodiment of the present disclosure provides a method of operating a data storage device including a central controller and a plurality of channel controllers. The central controller issues memory commands to the plurality of channel controllers. Each of the channel controllers includes a command queue for storing the corresponding memory commands for a distinct set of a plurality of sets of non-volatile memory (NVM) devices and providing backlog information. The central controller receives the backlog information of the pending memory commands in the command queues, and adjusts a clock frequency of the central controller and one or more clock frequencies of the plurality of channel controllers based on the backlog information such that the pending memory commands in each of the command queues are below a predetermined threshold level.

Another embodiment of the present disclosure provides a data storage device. The data storage device includes a plurality of sets of non-volatile memory (NVM) devices and a plurality of first means. Each first means stores memory commands for a distinct set of the plurality of sets of NVM devices and provides backlog information on the pending memory commands. The data storage device further includes a second means for issuing the memory commands to the plurality of first means, and for receiving the backlog information. The data storage device further includes a third means for adjusting a memory command processing throughput of the second means and the plurality of first means, based on the backlog information such that the pending memory commands in each first means are below a predetermined threshold level.

BRIEF DESCRIPTION OF THE DRAWINGS

The present disclosure can be understood in greater detail, and a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

A computing device (host) can use a data storage hierarchy that puts faster data storage closer to the host and slower storage farther away from the host. The faster storage may be volatile storage and generally is referred to as "memory", and the slower storage is typically persistent memory and often referred to as "data storage." Some examples of persistent memory are solid state storage device like flash memory (e.g., NAND flash). Some data storage systems may have a certain power budget or limitation that cannot be exceeded during system operation. In some implementations, a data storage system may use dynamic voltage and frequency scaling (DVFS) to reduce power as needed. However, the complexity and overhead associated with DVFS may not be justified for some low power implementations and practical for high performance solid state data storage device. Moreover, DVFS solutions may not be suitable in high-load and power throttling situations.

In a distributed data storage architecture, the non-volatile data storage may be organized into different channels or groups. Each channel includes non-volatile memory devices (e.g., NAND flash chips) that are controlled by a channel controller. The data storage system can use a central controller to control memory operations among the channels through the channel controllers. The central controller can provide a host interface to a host (e.g., a computer) to access the data in the data storage system. In such distributed data storage system, the loading of the multiple downstream channels needs to be carefully considered when adjusting the clock frequency of the central controller, for example, to reduce power consumption.

Referring now to the drawings, embodiments of systems and methods are provided for managing power consumption in memory systems for storing data. Some embodiments include systems, methods, and/or devices to reduce power consumption of memory controllers in response to memory command backlog in various situations.

Figure 1:
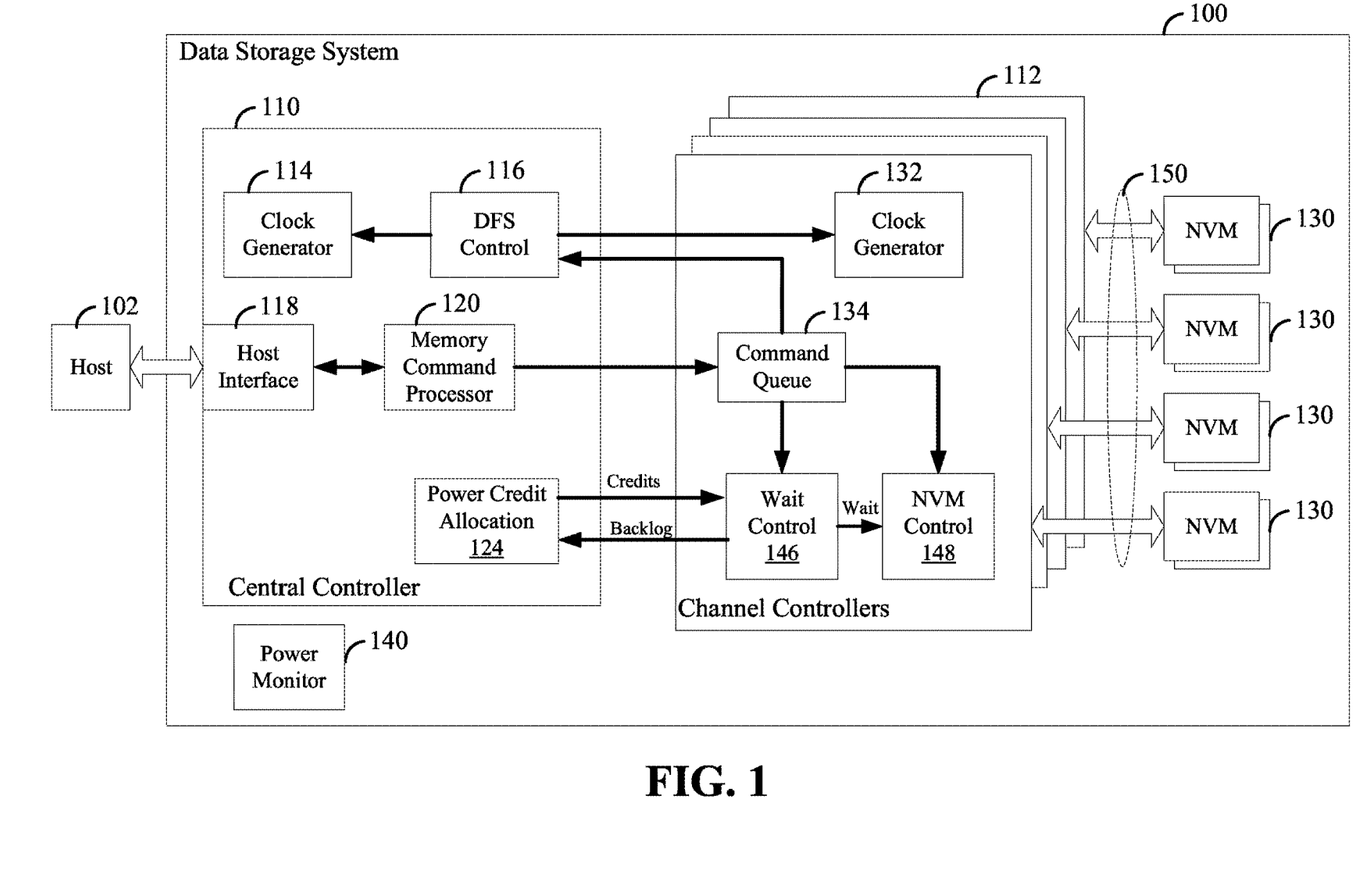
FIG. 1 is a block diagram illustrating an implementation of a data storage system in accordance with some embodiments.

FIG. 1 is a block diagram illustrating an implementation of a data storage system 100 in accordance with some embodiments. While some example features are illustrated, various other features have not been illustrated for the sake of brevity and so as not to obscure more pertinent aspects of the exemplary implementations disclosed herein.

The data storage system 100 can provide persistent data storage to a host 102 or computer. The data storage system includes a central controller 110 and channel controllers 112. The central controller 110 includes various components, for example, a clock generator 114, a dynamic frequency scaling (DFS) control block 116, a host interface 118, a memory command processor 120, and a power credit allocation block 124. The host interface 118 provides the central controller 110 with an interface to a host 102 for data and control signal communication. The host 102 may be a computer or central processing unit that can store data in the data storage system. The clock generator 114 can be configured to generate one or more clock signals for driving various components of the central controller 110. For example, the clock generator 114 can output a clock signal for driving the memory command processor 120. The faster the clock signal (i.e., higher frequency), the faster the memory command processor 120 can process memory commands. However, faster clock speed can increase power consumption of the controller. Some examples of memory commands are used to write, read, and erase data at the non-volatile memory (NVM) 130 of the data storage system 100.

The DFS control block 116 can generate a frequency scale factor signal that dynamically controls the clock frequency of the clock generator 114. In one example, the clock generator 114 may have a base frequency F. When the scale factor is X as indicated by the frequency scale factor signal, the clock frequency may be determined as F multiple by X. Therefore, a scale factor greater than 1 increases the output clock frequency, while a scale factor less than 1 decreases the output clock frequency. The central controller 110 can dynamically change the clock scale factor to change the clock frequency as needed.

The memory command processor 120 receives memory commands from the host 102 via the host interface 118. In some examples, the host interface 118 may be a part or functional block of the memory command processor 120. Based on the commands or instructions received from the host 102, the memory command processor 120 generates and sends corresponding memory commands to the channel controllers 112 for writing, reading, and erasing data at the non-volatile memory (NVM) 130. In some embodiments, the NVM 130 may be NAND flash memory or the like.

Each channel controller 112 includes a clock generator 132 and a command queue 134. The clock generator 132 generates one or more clock signals for driving various components of the channel controller 112 based on a frequency scale factor signal received from the DFS control block 116. Therefore, the central controller 110, using the DFS control block 116, can dynamically adjust the clock frequencies outputted by the clock generator 132 of each channel controller 112. In some examples, the command queue 134 may be a first-in-first-out (FIFO) buffer configured to receive memory commands from the central processor 110 (e.g., memory command processor 120). Each channel controller 112 is configured to execute the memory commands stored in its command queue 134 to manage the data stored in the NVM 130. The faster the clock signal generated by the clock generator 132, the faster the channel controller 112 can perform the memory commands in its command queue 134. For example, the memory commands can cause the channel controller 112 to write, read, or erase data at the corresponding NVM 130.

The data storage system 100 may have a power monitor block 140 that is configured to monitor the power consumption of the system. For example, the power monitor block 140 may include sensors and circuitry (e.g., one or more current sensors and/or voltage sensors) configured to measure power consumption of different components of the data storage system 100. In some aspects of the disclosure, when the power consumption of the system is above a predetermined threshold, limit, or power budget, the data storage system 100 may perform power management operations to reduce or limit power consumption. In some power management scenarios, the performance of some components (e.g., the NVM 130) may be reduced, limited, or throttled. The data storage system 100 may include components and circuitry configured to perform power management functions. The power credit allocation block 124 allocates power credits to the channel controllers 112 and the associated NVM 130, and each channel controller 112 has a wait control block 146 and NVM control block 148 for controlling power throttling based on the allocated power credits. Power throttling refers to operations, for example, frequency and/or voltage reduction, that can reduce the power consumption of the throttled circuitry or components. A power credit may correspond to a certain amount of power that may be used by the circuitry. When a channel controller 122 and its associated NVM 130 are allocated certain amount of power credits, the channel controller 122 and NVM 130 can use an amount of power corresponding to the allocated power credits, for example, to execute memory commands.

Figure 2:
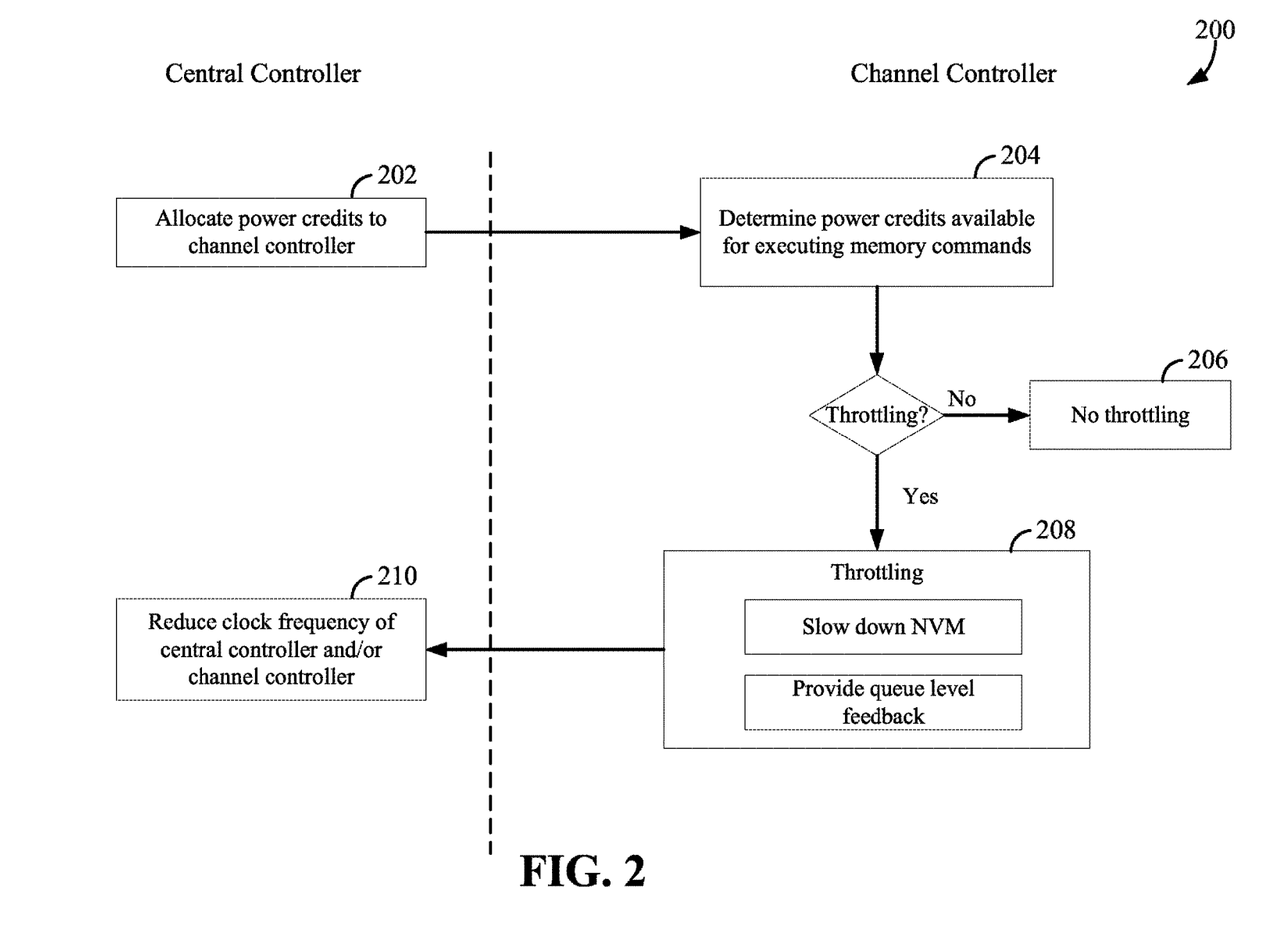
FIG. 2 is a flow chart illustrating a power management process of a data storage system in accordance with some embodiments.

FIG. 2 is a flow chart illustrating a power management process 200 in accordance with some embodiments. At the central controller side, the power credit allocation block 124 allocates power credits to each channel controller (202). At the channel controller side, the wait control block 146 may determine (204) if the allocated power credits are sufficient to perform the memory commands pending in its command queue 134. The wait control block 146 can output a WAIT signal to the NVM control block 148 to control power throttling of the NVM 130, if needed. If sufficient power credits are available to perform the memory commands in the command queue 134, the WAIT signal may indicate no throttling (206). Otherwise, if the allocated power credits are not sufficient, the WAIT signal may indicate throttling (208).

During power throttling, the NVM control block 148 can slow down the speed of sending memory commands to the NVM 130 and/or the operations at the NVM 130 such that power consumption can be reduced. The backlog of the command queue 134 may increase when the NVM control block 148 slows down memory command execution. In that case, the command queue 134 has backpressure or increasing backpressure. The wait control block 146 can provide the power credit allocation block 124 with feedback on the backlog or backpressure of the command queue 134. When the NVM 130 are throttled to reduce power consumption, the central controller 110 and/or channel controller 112 may not need to be running at full speed (i.e., at the rated clock rate or frequency). In that case, the DFS control block 116 may scale down (210) the clock frequencies of the central controller 110 and/or channel controller 112. The clocks of the channel controllers 112 may be scaled down to different degrees depending on the backpressure at their respective command queues.

Figure 3:
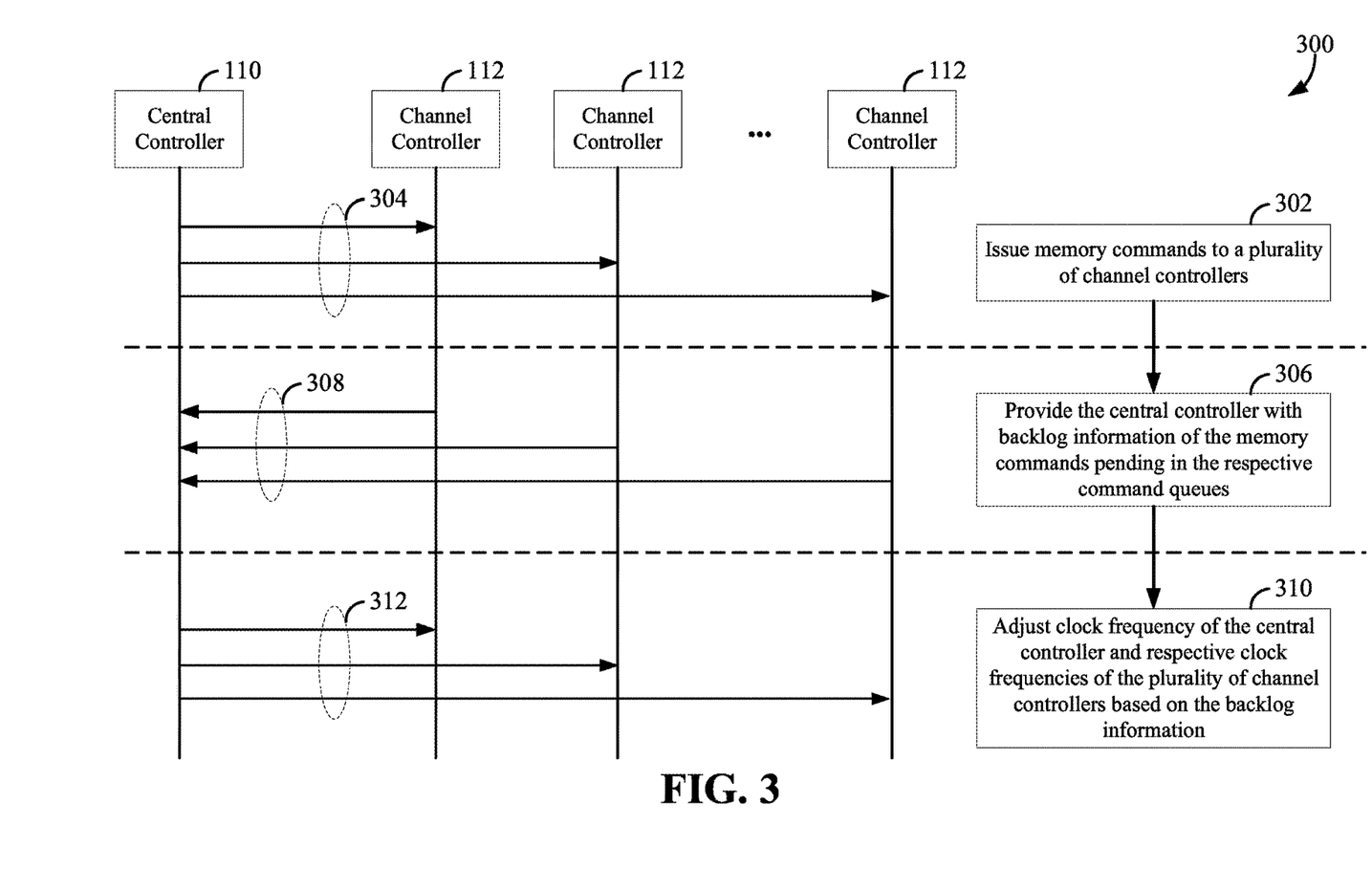
FIG. 3 is a flow chart and operational diagram illustrating a reactive power control process in accordance with some embodiments.

FIG. 3 is a flow chart illustrating a reactive power control process 300 in accordance with some embodiments. The data storage system 100 can utilize this reactive power control process to dynamically change clock frequencies of the controllers in response to the imbalance in memory command processing throughputs between the central controller 110 and channel controllers 112. The power saved in the controllers can be reclaimed as power credits, and thus more power credits may be made available for the channel controllers/NVM or reduce overall power consumption of the system.

At block 302, the central controller 110 issues memory commands 304 to a plurality of channel controllers 112. For example, each channel controller 112 includes a command queue 134 for storing the corresponding memory commands for a distinct set of a plurality of sets of NVM devices (e.g., NVM 130). The command queue may be a FIFO buffer that can hold a certain number of pending memory commands.

At block 306, each channel controller 112 provides the central controller 110 with backlog information 308 of the memory commands pending in the command queue 134. Each of the command queue 134 may have an output that indicates its backlog or backpressure. For example, the signal may indicate the number of memory commands pending in the command queue or a usage level of the command queue. Backpressure increases when the channel controller 112 receives new memory commands faster than it can complete the pending memory commands.

At block 310, the central controller 110 dynamically adjusts the clock frequency of the central controller 110 and/or respective clock frequencies of the channel controllers 112 based on the backlog information such that the memory commands pending in the respective command queues can be kept below a predetermined threshold level or in a certain range. For example, the DFS control block 116 can output suitable frequency scale factor signals 312 to the clock generator 114 in the central controller 110 and clock generators 132 in the channel controllers 112 to set the respective clock frequencies such that the data storage system 100 can meet a desired or minimum memory processing throughput or performance level. In general, when the clock frequency is reduced, the controller has lower memory command processing throughput. Therefore, when the central controller 110 has a lower throughput, it sends fewer memory commands to the command queue 134. In this close-loop reactive power control process, the central controller 110 can reduce the upstream processing speed so that the controllers stay just slightly ahead of the NVM in terms of memory command processing throughput. Therefore, the NVM interface 150 (e.g., a memory interface) may be kept fully occupied as much as possible while the controllers can reduce power consumption when running at lower clock frequencies.

When the clocks of the central controller 110 and/or channel controller 112 are dynamically reduced in response to the backlog of the command queues 134 of the channel controllers 112, the power saved at the controllers may be reclaimed as power credits that can be made available for the NVM 130. When more power credits can be allocated to the NVM 130, power throttling may not be needed or may be reduced. This close-loop power control process may be called reactive power management because the power is adjusted in response to the imbalance in command processing throughputs between the central controller and channel controllers.

In general, when the command queue 134 has backpressure, the channel controller 112 operates as fast as possible to keep up with the command traffic upstream from the central controller 110. In that case, the central controller 110 may slow down its clock so that fewer memory commands are processed and sent to the command queues 134 at the channel controllers 112. During throttling as described above, memory operations (e.g., read, write, erase) at the NVM 130 are gated, limited, or modulated. For example, the NVM control block 148 may gate or limit the issuing of memory commands to the NVM 130 through the NVM interface 150. Therefore, during throttling, the channel controller 112 may operate slower and still keep up with the NVM 130. That is, during throttling, backpressure may be caused by the gating of memory commands, not the channel controller 112 being too slow to keep up with the upstream central controller 110. In some cases, therefore, the central controller 110 and/or channel controllers 112 may slow down to reduce power consumption without increasing backpressure at the command queues. The central controller 110 or channel controller 112 may maintain the clock frequency of the NVM interface 150 when the clock frequency of the central controller 110 and/or clock frequency of any of the channel controllers 112 is adjusted (e.g., reduced) so that memory commands and/or data can move across the memory interface 150 without slowing down.

Figure 4:
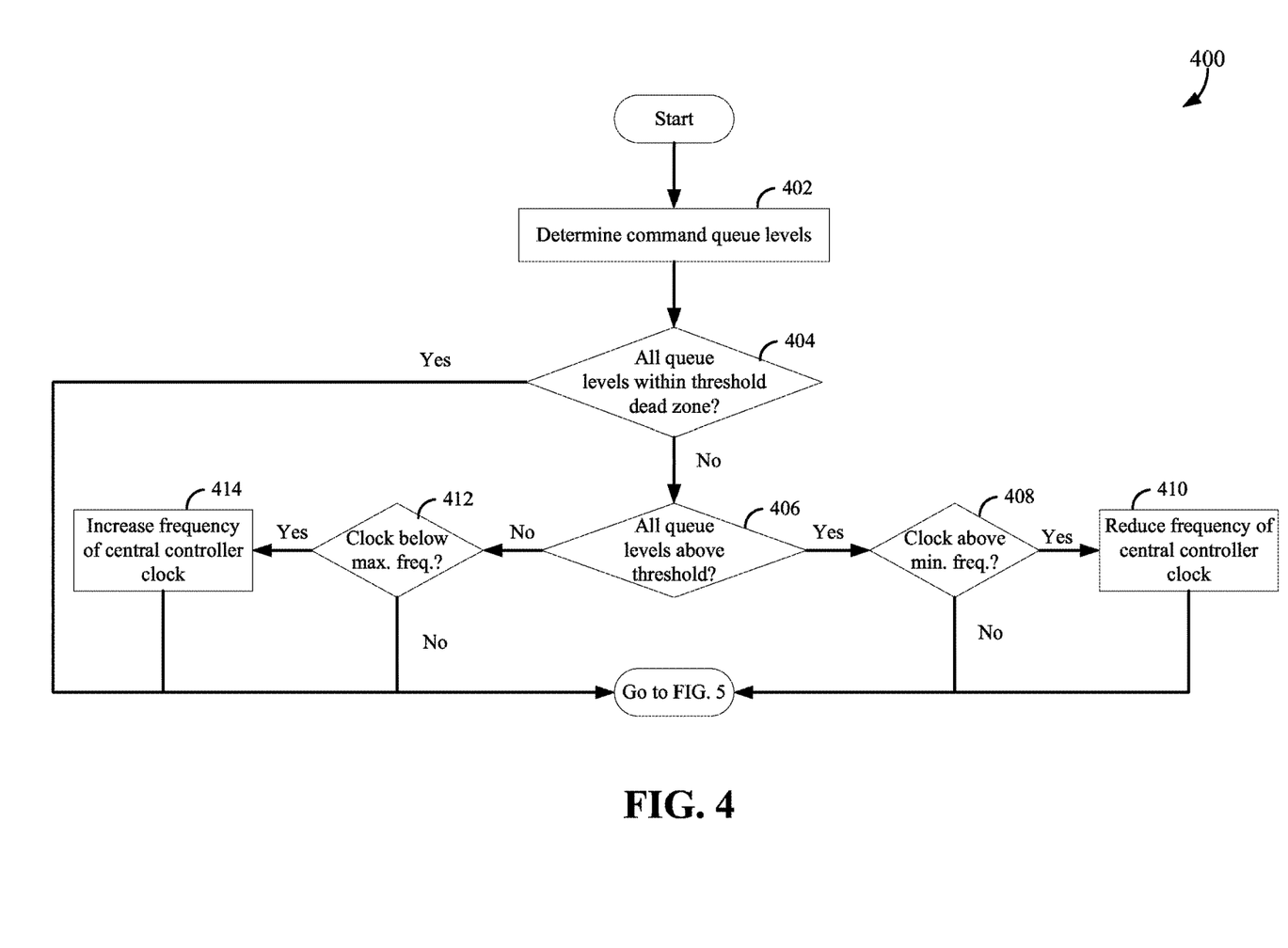
FIGS. 4 and 5 are a flow chart illustrating a process for controlling a clock frequency of a central controller in accordance with some embodiments.

FIG. 4 is a flow chart illustrating a process 400 for controlling the clock frequency of the central controller 110 in accordance with some embodiments. At block 402, the central controller 110 determines the command queue levels of all the command queues in the channel controllers 112. For example, the DFS control block 116 may receive backlog information from the command queue 134 of each channel controller. The backlog information indicates the level or quantity of memory commands pending in the command queue 134. At decision block 404, the central controller determines whether all of the queue levels (e.g., combined queue level) are within a threshold dead zone. For example, when all of the queue levels are within the threshold dead zone (i.e., the "Yes" path), the central controller 110 does not change the clock frequency of the central controller 110. The threshold dead zone may be a predetermined range of queue levels in which the central controller can maintain its current clock frequency and achieve a predetermined (e.g., minimum) memory command processing throughput among the channel controllers. In some examples, different channel controllers may have the same or different threshold dead zones for their respective command queues.

At decision block 406, when one or more queue levels are not within the threshold dead zone, the central controller 110 determines whether all of the queue levels are above a predetermined threshold. A same threshold or different respective thresholds may be used for the channel controllers 112. When all of the queue levels are above the predetermined threshold, it may indicate that all of the command queues have backpressure. If there is backpressure from any of the channel controllers, whether throttling or not, it means that the channel controller(s) cannot keep up and therefore the central controller 110 can slow down and still keep up with the channel controllers 112. At block 408, the central controller 110 determines whether its clock frequency is above a minimum frequency. If the central controller's clock frequency is above the minimum frequency, at block 410, the central controller 110 may utilize the DFS control block 116 to reduce the clock frequency of the central controller. For example, the DFS control block 116 may output a frequency scale factor signal to the clock generator 114 to reduce its clock frequency.

At block 412, when not all of the queue levels are above the threshold, the central controller 110 determines whether its clock frequency is below a maximum frequency. If the central controller's clock frequency is below the maximum frequency, at block 414, the central controller 110 may utilize the DFS control block 116 to increase the clock frequency of the central controller.

Figure 5:
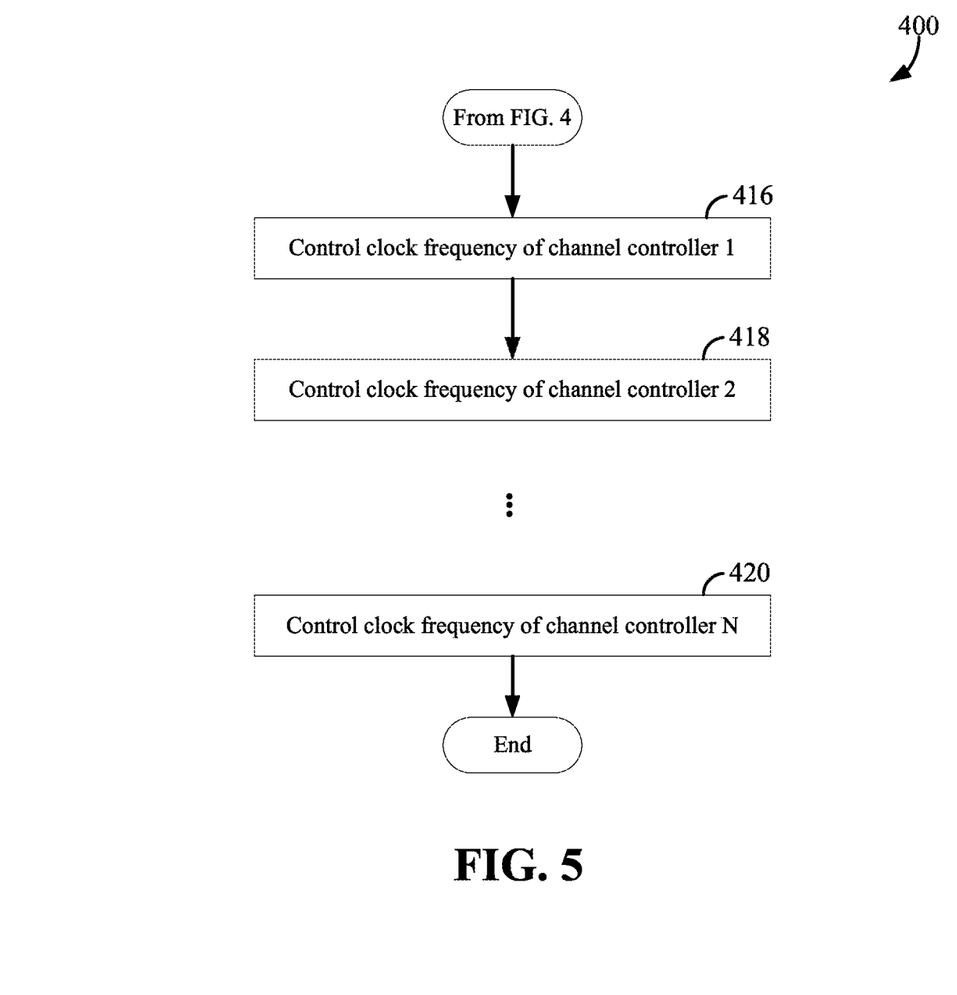
Figure 6:
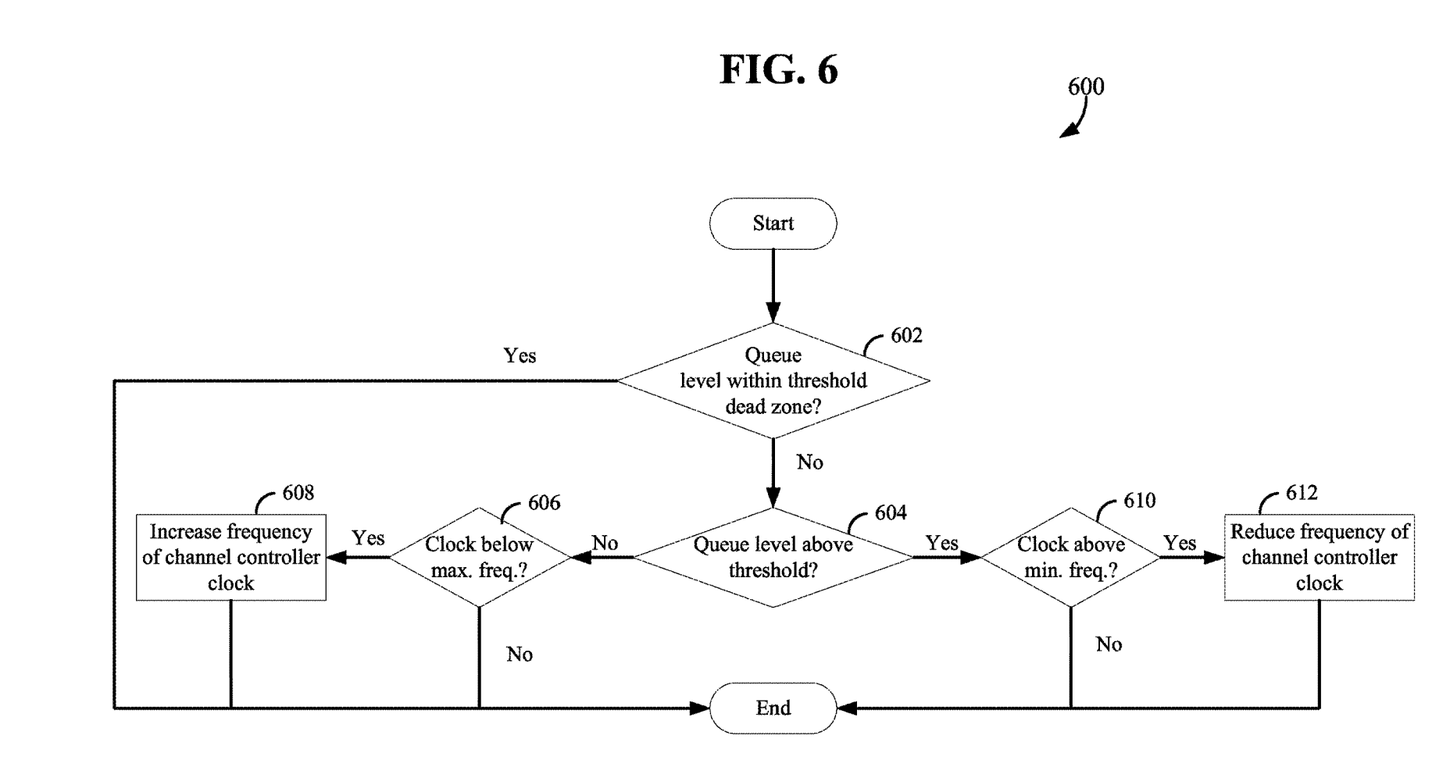
FIG. 6 is a flow chart illustrating a process for controlling clock frequencies of channel controllers in accordance with some embodiments.

FIGS. 5 and 6 are flow charts illustrating control processes 500 and 600 for controlling the clock frequency of the channel controllers 112 in accordance with some embodiments. For example, the central controller 110 may perform the process 500 to control the clock frequency of N channel controllers 112 after adjusting the clock frequency of the central controller 110 using the process 400 of FIG. 4. Referring to FIG. 5, at block 416, the central controller 110 may control the clock frequency of a first channel controller 112 according to an algorithm illustrated in FIG. 6. Referring to FIG. 6, at decision block 602, the central controller 110 determines whether the command queue level is within a threshold dead zone. For example, when the queue level is within the threshold dead zone (i.e., follow the "Yes" path), the central controller 110 does not change the clock frequency of this particular channel controller 112. The threshold dead zone may be a predetermined range of queue levels in which the channel controller can maintain its current clock frequency while providing the desired memory command processing throughput. In some examples, different channel controllers may have the same or different threshold dead zones for their respective command queues.

At decision block 604, when the queue level is not within the threshold dead zone, the central controller 110 determines whether the queue level is above a predetermined threshold. A same threshold or different respective thresholds may be used for different channel controllers 112. When the queue level is above the predetermined threshold, it may indicate that the command queue/channel controller has a high backpressure. In that case (i.e., follow the "yes" path), at decision block 606, the central controller 110 determines whether the channel controller's clock frequency is below a maximum frequency. If the channel controller's clock frequency is below the maximum frequency, at block 608, the central controller 110 may utilize the DFS control block 116 to increase the clock frequency of the channel controller. Increasing the clock frequency can increase memory command processing throughput to reduce the backpressure of the command queue.

At decision block 610, if the queue level is not above the predetermined threshold, the central controller 110 determines whether the channel controller's clock frequency is above a minimum frequency. If the channel controller's clock frequency is above the minimum frequency, at block 612, the central controller 110 may utilize the DFS control block 116 to reduce the clock frequency of the channel controller. For example, the DFS control block 116 may output a frequency scale factor signal to the clock generator 132 to adjust (e.g., reduce or increase) the clock frequency of the channel controller 112. Reducing the clock frequency can reduce power consumption of the channel controller.

The central controller 110 may repeat the above-described algorithm illustrated in FIG. 6 to control the clock frequency of each channel controller 112. Referring back to FIG. 5, at block 418, the central controller 110 may utilize the same algorithm to control the clock frequency of a second channel controller 112. Subsequently, at block 420, the central controller 110 may utilize the algorithm illustrated in FIG. 6 to control the clock frequency of the N-th channel controller 112.

As described above, the clock frequencies of the central controller 110 and channel controllers 112 are dynamically controlled or adjusted in response to backpressure of the command queues. If there is backpressure from any of the channel controllers, whether throttling or not, it means that the channel controller(s) 112 cannot keep up and therefore the central controller 110 can slow down and still keep up with the channel controller(s) 112. If throttling is in use, the power saved in the central controller can be reclaimed by, for example, the channel controllers 112 and/or NVM 130, resulting in reduced throttling and increased performance for the same power draw. If no throttling is in use, the overall system power can be reduced, resulting in lower overall system power consumption for the same performance.

In some embodiments, each channel controller 112 may be implemented in a number of pipeline stages including the NVM 130. The clock frequencies of the pipeline stages can be adjusted individually in order to keep the pipeline stages balanced in throughput. For example, if there is a certain amount of power (e.g., power credits) available for the pipeline stages, but not enough to operate all pipeline stages concurrently at the rated frequency, the central controller 110 can adjust the clock frequency of each pipeline stage or component to dynamically share the available power while ensuring that each stage can maintain a minimum performance level. For example, when current NVM operations (e.g., read, write, erase) are completed, the amount of power available may increase and one or more pipeline stages can be sped up to a higher clock frequency. In another example, when "excess" performance is within the pipeline stages and NVM operations are still pending, it means the pipeline stages' throughput are higher than the NVM. In that case, one or more pipeline stages can be slowed down to balance the NVM-to-pipeline performance levels.

In some embodiments, a data storage device may include various means for performing the various functions and procedures described above in relation to FIGS. 1-6. For example, the data storage device may include a plurality of first means. Each first means may be the command queue 134 that can store memory commands for a set of NVM devices 130 and provide backlog information on the pending memory commands. The data storage device may include a second means for issuing the memory commands to the plurality of first means, and for receiving the backlog information. For example, the second means may be the memory command processor 120. The data storage device may include a third means for adjusting a memory command processing throughput of the second means and the plurality of first means, based on the backlog information such that the pending memory commands in each first means are below a predetermined threshold level. For example, the third means may be the dynamical frequency scaling (DFS) control block 116.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A data storage device comprising:
   a plurality of sets of non-volatile memory (NVM) devices;
   a central controller; and
   a plurality of channel controllers, each channel controller coupled to a distinct set of the plurality of sets of NVM devices, each channel controller comprising a command queue configured to store pending memory commands and provide backlog information,
   wherein the central controller is configured to:
      receive the backlog information of the command queues of the plurality of channel controllers; and
      adjust a clock frequency of the central controller and one or more clock frequencies of the plurality of channel controllers based on the backlog information such that the pending memory commands in each of the command queues are below a predetermined threshold level.

2. The data storage device of claim 1, wherein the central controller is further configured to:
   reduce the clock frequency of the central controller when the backlog information indicates that the pending memory commands in the command queue of at least one of the channel controllers exceeds a predetermined threshold level.

3. The data storage device of claim 1, wherein the central controller is further configured to:
   reduce at least one of the clock frequency of the central controller or the one or more clock frequencies of the plurality of channel controllers based on the backlog information.

4. The data storage device of claim 3, wherein the central controller is further configured to:
   reduce at least one of the clock frequency of the central controller or the one or more clock frequencies of the plurality of channel controllers when the backlog information indicates that a memory command processing throughput of the central controller is different from that of at least one of the channel controllers.

5. The data storage device of claim 3, wherein each of the plurality of channel controllers is configured to:
   maintain a clock frequency of a memory interface coupled between the plurality of channel controllers and the plurality of sets of NVM devices.

6. The data storage device of claim 3, wherein the central controller is further configured to:
   determine reclaimed power credits corresponding to power saved when reducing at least one of the clock frequency of the central controller or the one or more clock frequencies of the plurality of channel controllers; and
   allocate the reclaimed power credits to one or more of the plurality of channel controllers for executing memory commands.

7. The data storage device of claim 1, wherein each of the plurality of channel controllers is configured to:
   determine the backlog information;
   receive power credits allocated by the central controller, based at least in part on the backlog information; and
   limit execution of memory commands in the command queue in accordance with the received power credits.

8. The data storage device of claim 7, wherein each of the plurality of channel controllers is further configured to:
   control a speed of issuance of the memory commands to the distinct set of the plurality of sets of NVM devices based on the power credits.

9. A method of operating a data storage device comprising a central controller and a plurality of channel controllers, the method comprising:
   at the central controller, issuing memory commands to the plurality of channel controllers, each of the channel controllers comprising a command queue for storing the corresponding memory commands for a distinct set of a plurality of sets of non-volatile memory (NVM) devices and providing backlog information;
   at the central controller, receiving the backlog information of the pending memory commands in the command queues; and
   adjusting a clock frequency of the central controller and one or more clock frequencies of the plurality of channel controllers based on the backlog information such that the pending memory commands in each of the command queues are below a predetermined threshold level.

10. The method of claim 9, further comprising:
reducing at least one of the clock frequency of the central controller or the one or more clock frequencies of the plurality of channel controllers based on the backlog information.

11. The method of claim 10, further comprising:
reducing at least one of the clock frequency of the central controller or the one or more clock frequencies of the plurality of channel controllers when the backlog information indicates that a memory command processing throughput of the central controller is different from that of at least one of the channel controllers.

12. The method of claim 10, further comprising, at each of the plurality of channel controllers:
maintaining a clock frequency of a memory interface coupled between the plurality of channel controllers and the plurality of sets of NVM devices.

13. The method of claim 10, further comprising:
determining reclaimed power credits corresponding to power saved when reducing at least one of the clock frequency of the central controller or the one or more clock frequencies of the plurality of channel controllers; and
allocating the reclaimed power credits to one or more of the plurality of channel controllers for executing memory commands.

14. The method of claim 9, further comprising, at each of the channel controllers:
determining the backlog information of the command queue;
receiving power credits allocated by the central controller, based at least in part on the backlog information; and
limit execution of memory commands in the command queue in accordance with the received power credits.

15. The method of claim 14, further comprising, at each of the plurality of channel controllers:
controlling a speed of issuance of the memory commands to the distinct set of the plurality of sets of NVM devices based on the power credits.

* * * * *